United States Patent [19]

Comfort

[11] Patent Number: 4,911,633
[45] Date of Patent: Mar. 27, 1990

[54] APPARATUS FOR PLASTIC TUBING MANUFACTURE

[76] Inventor: Gordon A. Comfort, 5423 Sutton Rd., Britton, Mich. 49229

[21] Appl. No.: 232,137

[22] Filed: Aug. 15, 1988

[51] Int. Cl.$^4$ .............................................. B29C 53/30
[52] U.S. Cl. .................................... 425/396; 264/508; 425/325; 425/369
[58] Field of Search ............... 425/396, 369, 336, 325, 425/259, 233, 539; 264/508, 286; 164/459, 429

[56] References Cited

U.S. PATENT DOCUMENTS

| | | | |
|---|---|---|---|
| 3,188,690 | 6/1965 | Zieg | 425/396 X |
| 3,776,679 | 12/1973 | Hegler | 425/539 X |
| 3,779,684 | 12/1973 | Folkes | 425/233 |
| 3,784,346 | 1/1974 | Maroschak | 425/539 X |
| 3,924,992 | 12/1975 | Hegler | 425/539 X |
| 3,941,639 | 3/1976 | Maroschak | 264/508 X |
| 3,981,663 | 9/1976 | Lupke | 425/396 X |
| 4,199,314 | 4/1980 | Lupke et al. | 425/396 X |
| 4,212,618 | 7/1980 | Hegler et al. | 425/369 X |
| 4,439,130 | 3/1984 | Dickhut et al. | 264/286 X |
| 4,504,206 | 3/1985 | Lupke et al. | 425/369 X |
| 4,662,428 | 5/1987 | Trendov | 164/459 |
| 4,681,526 | 7/1987 | Lupke | 425/336 X |
| 4,787,598 | 11/1988 | Rahn et al. | 425/396 X |

Primary Examiner—Richard L. Chiesa
Attorney, Agent, or Firm—Bertram F. Claeboe

[57] ABSTRACT

The present invention is directed to the manufacture of plastic tubing exemplified by corrugated plastic tile and parts related thereto, in which molds for shaping an extrudable plastic material are caused to shuttle linearly forwardly and rearwardly with respect to an extruding source of said plastic material. Sequentially related to linear mold movement is opening and closing mold action, which is correlated to the discharge of plastic material from the extruding source thereof. Provision is also made herein during the course of linear mold movement for parking one or more predetermined molds at a location spaced from the extruding source.

7 Claims, 8 Drawing Sheets

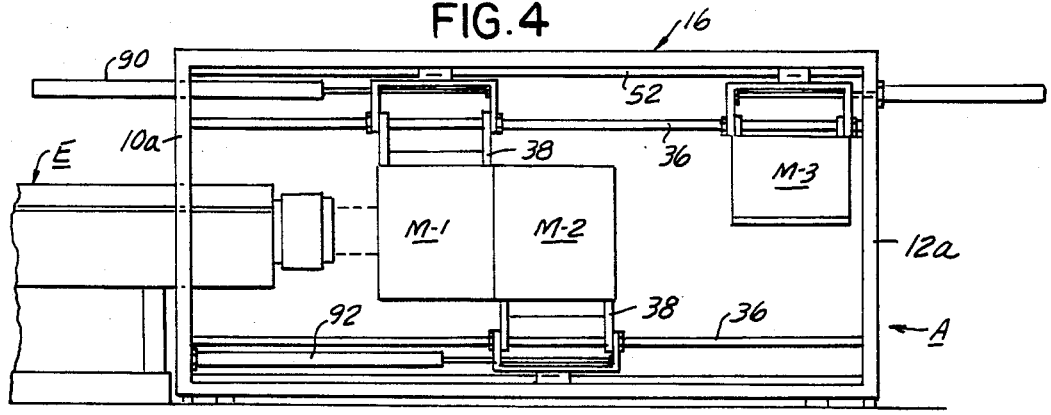
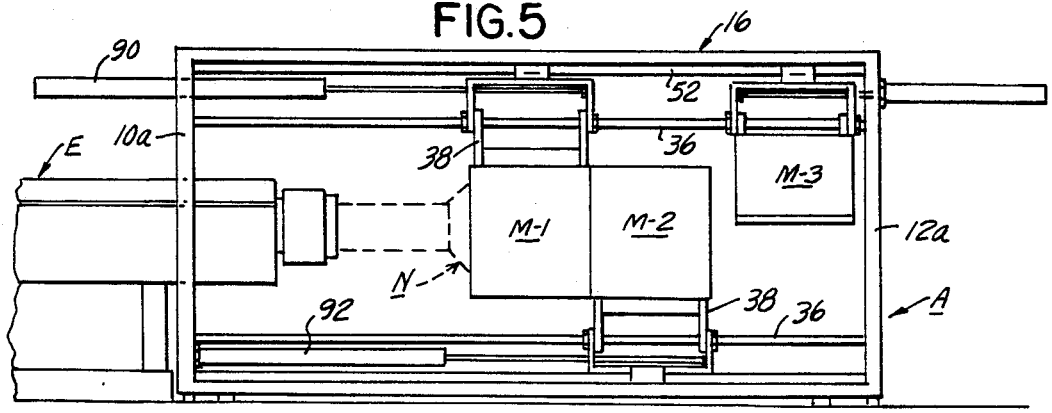
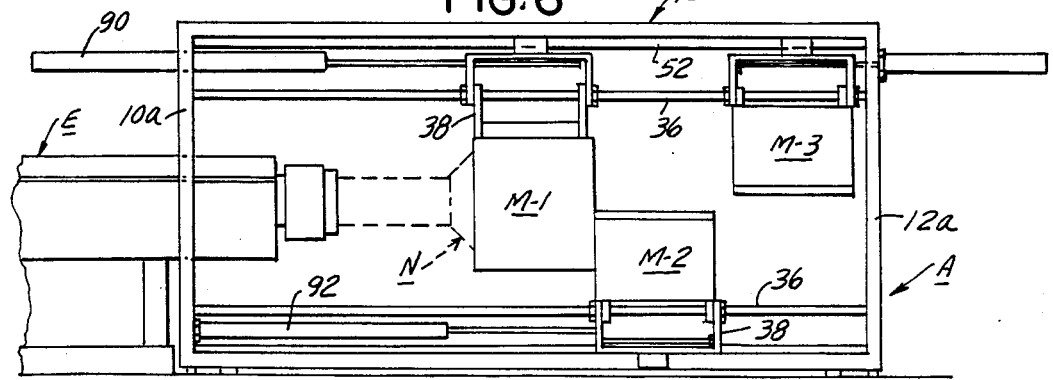
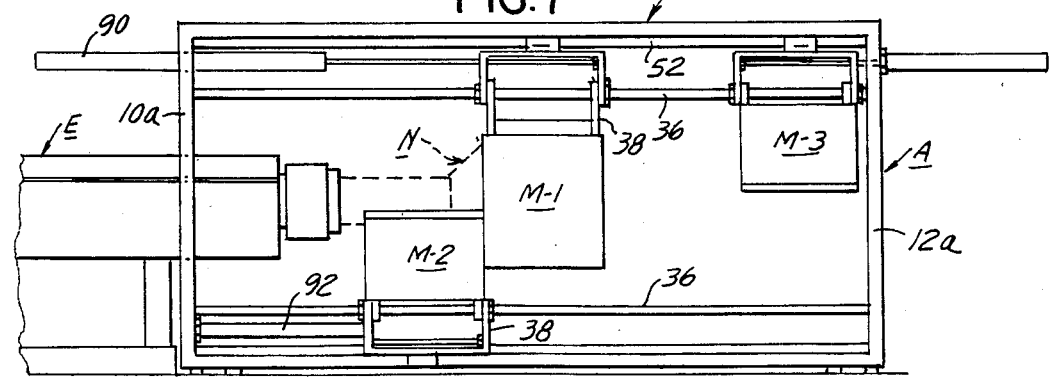

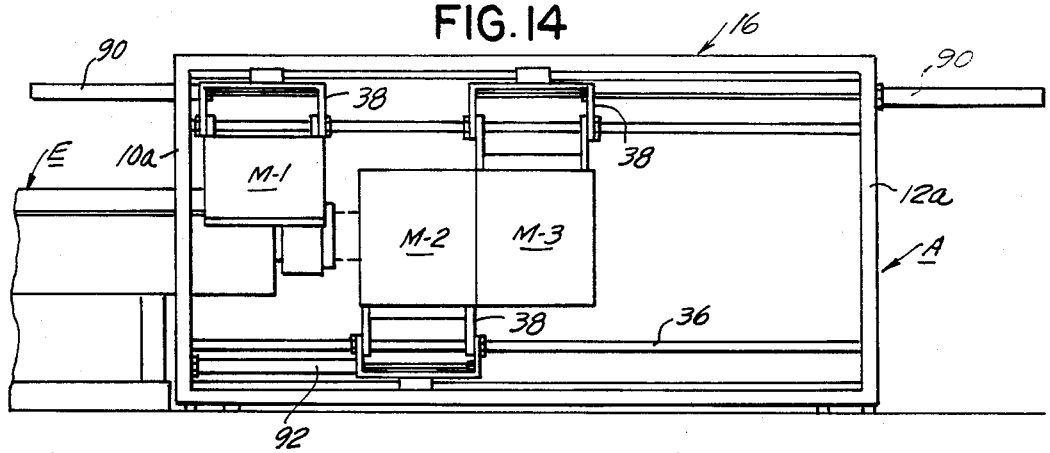
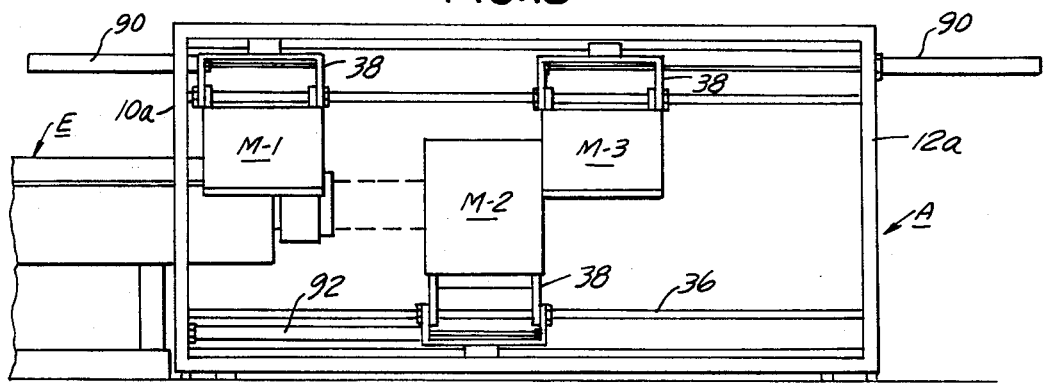
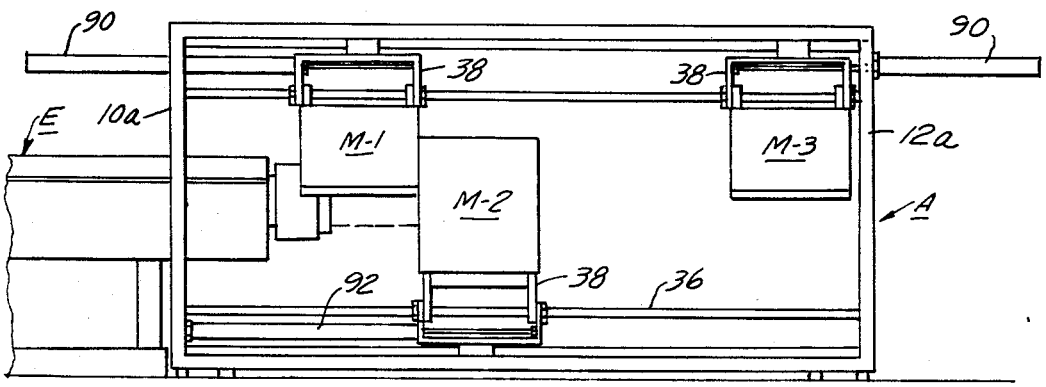

APPARATUS FOR PLASTIC TUBING MANUFACTURE

BACKGROUND OF THE INVENTION

It is known in the art to which this invention pertain to produce corrugated thermoplastic tubing or tile for drainage and water flow systems utilizing forming apparatus commonly termed a corrugator. Exemplary apparatus for this purpose generally comprises a pair of complementary upper and lower mold assemblies, each comprising an endless chain of articulately interconnected mold blocks, and means for guiding the mold blocks along an endless track having a forward run and a return run. Each mold block is complementary to a respective mold block of the other assembly, and the mold blocks cooperate in pairs along the forward run to form an axially extending tunnel defining a tubular mold having a corrugated wall. The mold assemblies are positioned so as to locate the extrusion head at the entrance to the tunnel coaxially therewith, and extruded thermoplastic material is expanded by blow molding to conform to the interior surface of the mold. In such an arrangement, it is also conventional to cool the mold blocks in order to augment the formation of the thermoplastic tubing, and to induce a vacuum between the extruded plastic and the wall of the molding tunnel to assure the mating thereof. U.S. Pat. No. 3,981,663 issued Sept. 21, 1976 is generally illustrative of a corrugator of the foregoing character.

Rotary travel of the mold blocks necessarily requires complex structures and entails inconvenience in effecting the coolant and vacuum connections, since positive mold cooling occurs only during the return run of the mold blocks along the continuous irreversible rotary or generally helical path. Rather cumbersome rotary type hose disconnects is one pursuit known to the art to alleviate this problem.

Complete stoppage of the corrugator is also required in order to effect mold changes. To explain, in addition to prescribed lengths of the corrugated flexible plastic tubing or tile, requirements exist for tubing fittings exemplified by couplings, adapters, end caps, and the like. Production of such fittings requires mold changes on the corrugator, and consequent down time of the entire apparatus. This fact is noted near the end of the specification in U.S. Pat. No. 4,439,130 issued Mar. 27, 1984.

This same patent in Column 9 thereof also notes that the mold assemblies not dedicated to the formation of the molding tunnel are continuously returned along the return trackway where they are cooled. Quite clearly, the provision of a greater number of mold assemblies than that actually required for production substantially increases tooling cost, and other disadvantages naturally flow therefrom.

SUMMARY OF THE INVENTION

The foregoing and other disadvantageous characteristics of prior art apparatus are herein effectively eliminated by provision of method and apparatus for the manufacture of plastic tubing and shapes related thereto featuring imparting linear movement to the mold assemblies to cause them to shuttle in a straight line path back and forth relative to a forming station. Linear movement of the mold blocks or mold assemblies may be effected in a variety of ways, and actuating means for this purpose may illustratively be provided by fluid or gear systems. A significant and further novel aspect of the present invention is the provision of one or more parking stations whereat one or more mold assemblies may be positioned temporarily prior to being returned to the forming station for reception of extrudable thermoplastic material. This novel approach to the production of corrugated plastic tubing effectively overcomes the noted deficiencies of the prior art, and other advantages of applicant's novel forming system will become apparent as the description thereof now proceeds.

BRIEF DESCRIPTION OF THE DRAWINGS

FIG. 4 through 16 are schematic diagrammatic views portraying the novel shuttling and parking system featured in applicant's inventive contribution to the art of corrugated plastic tubing manufacture;

DESCRIPTION OF THE PREFERRED EMBODIMENT

Figure 1:
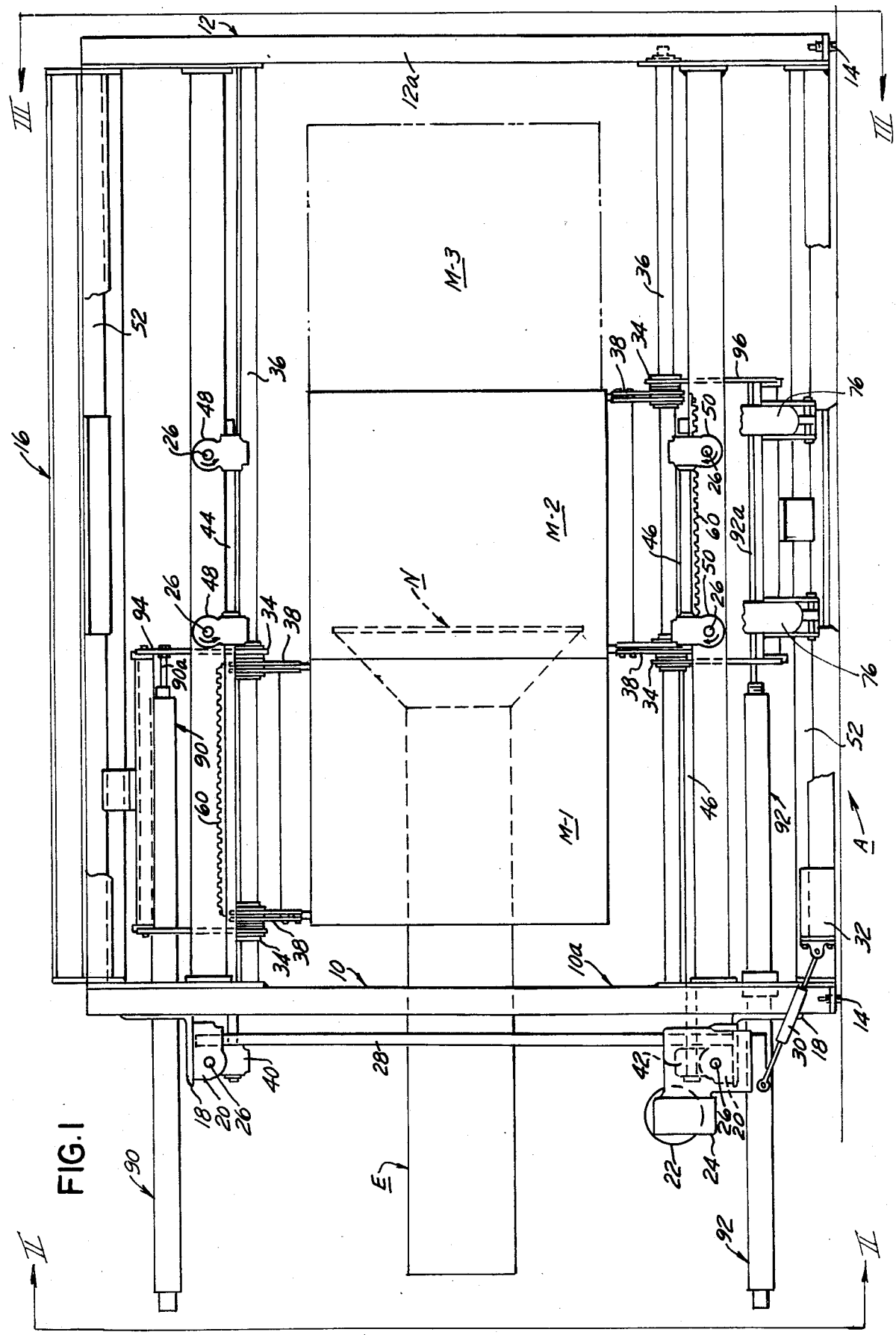
FIG. 1 is a side elevational view of novel apparatus for practicing the steps of the present invention.
Figure 2:
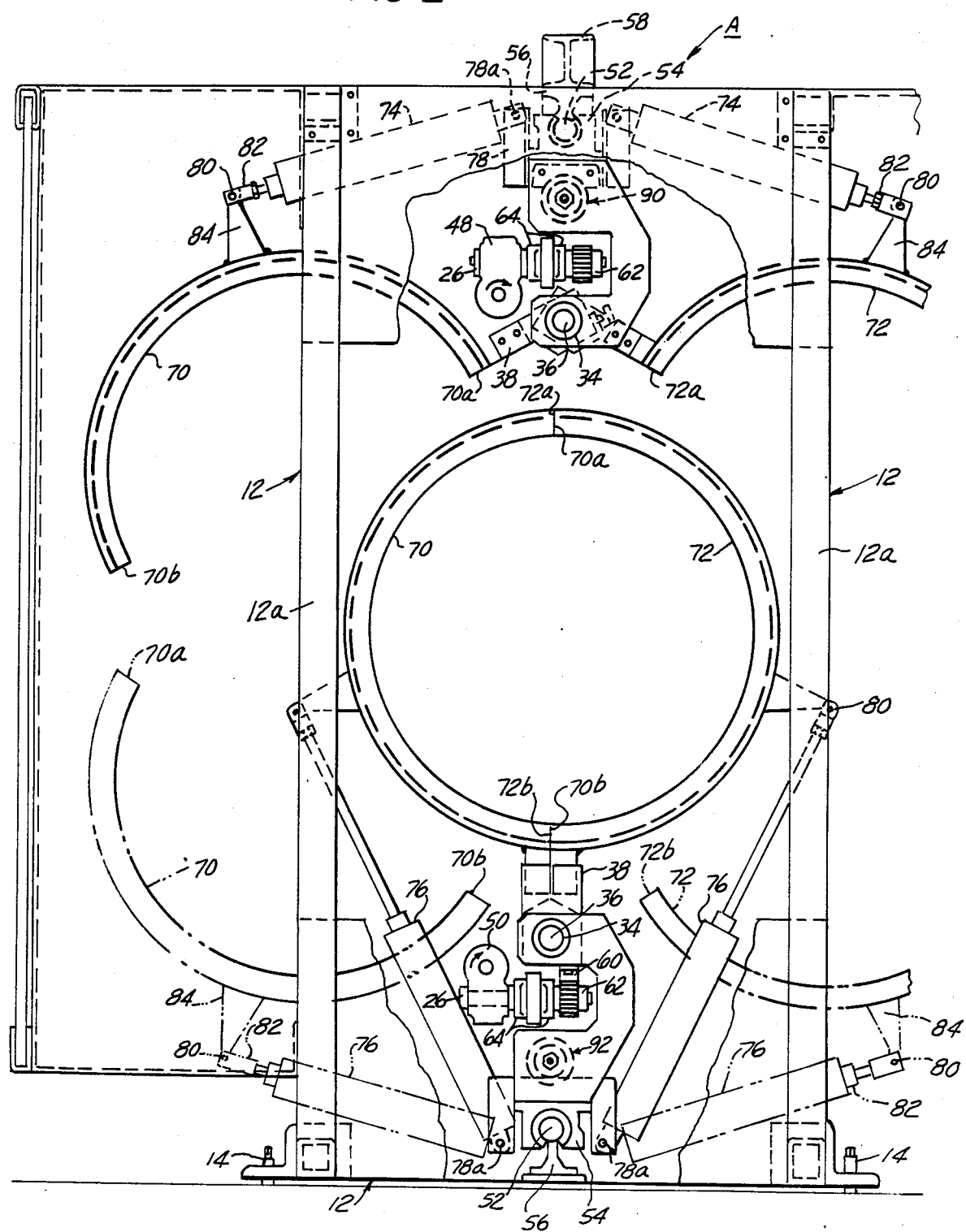
FIG. 2 is an end view of corrugating apparatus taken substantially along the line 2—2 of FIG. 1.
Figure 3:
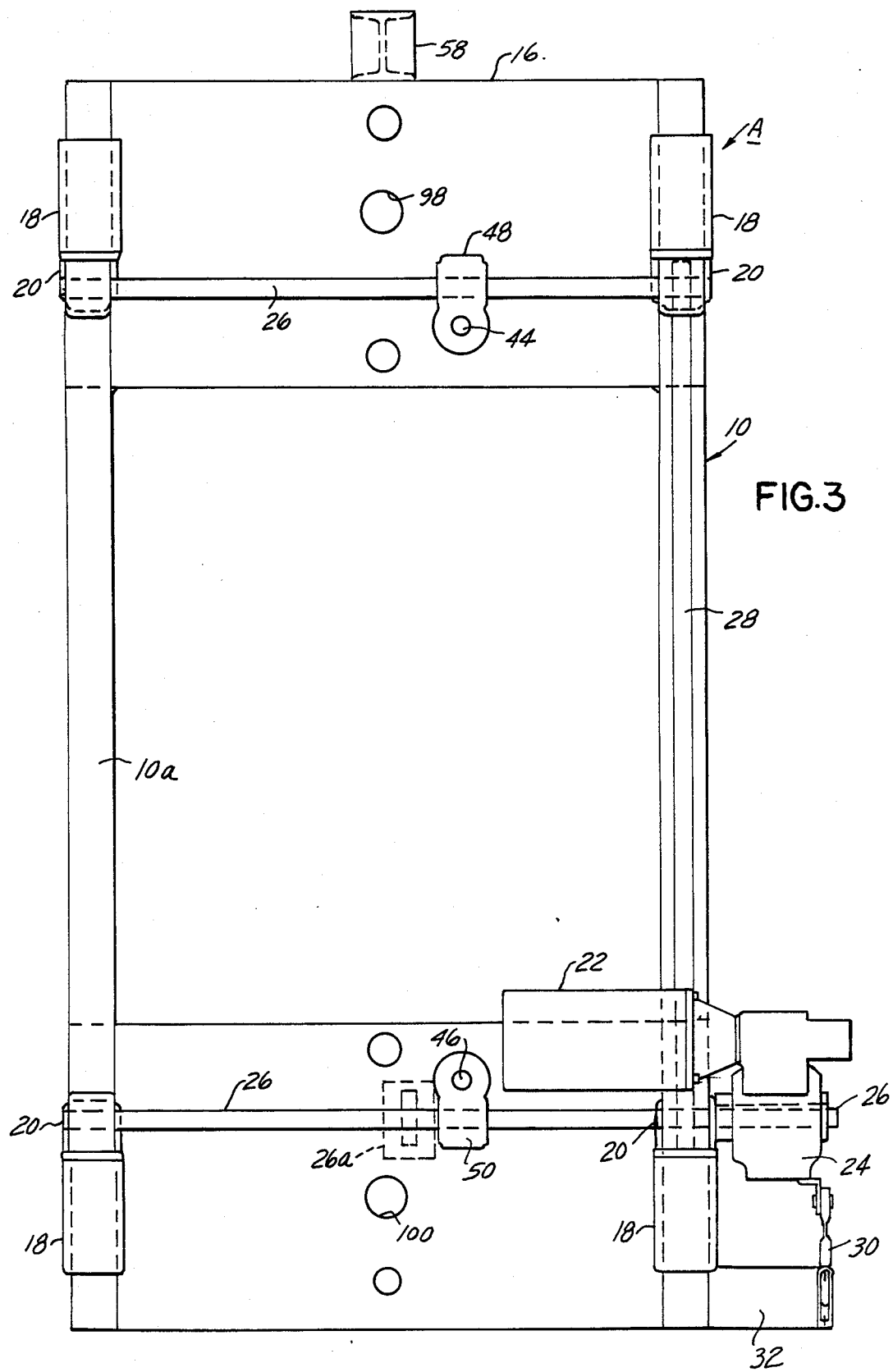
FIG. 3 is an end view of the present apparatus taken substantially along the line 3—3 of FIG. 1.

Referring now first to FIGS. 1, 2, and 3 of the drawings, an exemplary form of apparatus for producing corrugated plastic tubing and fittings therefor is designated generally by the legend A. Structural framework for supporting the corrugating apparatus A may take various forms, and may comprise a pair of longitudinally spaced end frames 10 and 12 secured to foundation structure as at 14, and a top frame 16 suitably connected to end frames 10 and 12. The structural framework may incorporate additional support members (not shown), and the framework may be mounted upon a suitable carriage or the like if mobility relative to extruder E is desired. Vertical members 10a and 12a may form a part of end frames 10 and 12, respectively.

Broadly stated, linear movement of mold blocks M-1 and M-2, two of which are shown in full line in FIG. 1, relative to one another and also relative to extruder E, as well as the sequential opening and closing of the named molds, is effected by a plurality of interacting actuating means responsive to an electrically and electronically equipped control system of known commercial construction having timing functions incorporated therein. The description now to follow will note in detail mechanisms effective to perform the novel linear shuttling and parking operations of applicant's corrugator A.

Secured to end frame 10 along the upper and lower ends thereof and at opposite sides of the end frame 10 are a plurality of bracket means 18 supporting gear boxes 20. End frame 10 at one side thereof along its lower end suitably mounts motor means 22 operable through a two stage reducer 24 to drive shaft means 26 effective through gear box 20 to drive shaft means 28. Support for reducer means 24 and parts connected thereto is provided by connector member 30 attached as at 32 to fixed structure.

Extending horizontally between end frames 10 and 12 are a pair of fixed shaft members 36 mounting bearing means 34 which are locus for rotating bearing means (not shown) through which bracket means 38 provide opening and closing of mold blocks M1 and M-2, both of which are shown in FIG. 1 in closed position. Mounted by fixed structure are a pair of upper and lower gear boxes 40 and 42 through which pass upper and lower drive shaft members 44 and 46 terminating in upper and lower gear boxes 48 and 50, respectively (FIG. 3). As was earlier noted, motor means 2 through two stage reducer 24 is effective to drive shaft means 26, and through gear box 20, shaft means 28 is driven. The latter shaft means 28 actuates gear boxes 20 which turn shaft means 26, causing rotation of upper and lower shaft members 44 and 46 which terminate in upper and lower gear boxes 48 and 50, respectively.

By provision of the cooperating mechanisms described hereinabove, mold block on carriage M-2 is advanced forwardly at a precisely controlled speed to the active or melt receiving position with respect to extruder nozzle N, shown in phantom lines in FIG. 1. When cavity (not shown) of mod M-2 has been filled, the following action takes place utilizing apparatus now to be described with additional reference being made to FIG. 2 of the drawings. The linear movement o the mold assemblies on mold blocks and the opening and closing thereof will be better understood by reference first to the supporting structure for the mold blocks M-1 and M-2.

Suitably affixed to the top frame 16 and at its opposite ends to the end frames 10 and 12 is a rod-like support and guide member 52 contacted by bearing means 54 and shaft assembly 56. Additional top shaft support may be provided as indicated at 58 in FIG. 3. Positional in adjacency to the support structure just described as first actuating means for precisely controlling movement of a mold carriage to an active or melt-receiving position, illustrated in FIG. 1 by the mold carriage or mold block designated by the legend M-2. First actuating means is illustrated herein as taking the form of a pinion gear and drive rack arrangement, however, it will be appreciated that i substitution therefor a finely tuned fluid system may be employed, or lead screws, or chains could be utilized.

As is shown in FIGS. 1 and 3, linear movement of the mold carriages M-1 and M-2 in an essentially straight line path forwardly and rearwardly is accomplished with a pair of substantially identical firs actuating means. In brief, the basic difference is that the first actuating means for mold carriage M-1 is connected along the top side thereof, while in the case of mold carriage M-2 the first actuating means is supported along the bottom side or base thereof. Bracket means 38 for mold blocks M-1 and M-2 provide a connection for drive racks 60 which mesh with pinion gears 62 actuated by shaft means 26 terminating in gear boxes 48 and 50, respectively. Shaft means 26 are journaled in bearing means 64.

To summarize the action of first actuating means, motor means 22 through two-stage reducer 24 is effective to drive shaft means 26, and through gear box 20, shaft means 28 is driven. The latter shaft means 28 actuates gear boxes 20 which turn shaft means 26, causing rotation of upper and lower shaft members 44 and 46 which terminate in upper and lower gear boxes 48 and 50, respectively. The latter gear boxes through shaft means 26 actuate pinion gears 62, which by being in meshing relation with drive racks 60 carried by mold assemblies M-1 and M-2, linear travel of said assemblies is effected in a precisely controlled manner until the mold blocks are positioned as shown in FIG. 1. The cooperative connection between the first actuating means described an second and third actuating means of this invention will shortly be described.

Second actuating means are provided primarily for the purpose of effecting an opening and closing of the mold assemblies M-1 and M-2. As appears best in FIG. 3, each of the mold assemblies is of the split or clam shell type, and accordingly comprises a pair of semi-cylindrical mold segments 70 and 72 having end surfaces 70a and 70b and 72a and 72b. It may be seen from FIG. 2 that when a mold assembly is in a fully closed position, substantially immediately prior to, during, or substantially immediately after the plastic injection, end surfaces 70a and 72a and end surfaces 70b and 72b are in firm abutment. Reference will be made later to an exemplary form of mold interlocking means, and one illustrative form of mold latching means.

The second actuating means for swingably moving the mold segments 70 and 72 from the open to closed positions, portrayed by full and dotted lines in FIG. 2, may be provided by fluid actuated cylinders, preferably of the hydraulic type. Generally equivalent mechanisms may be used in substitution however, and particular circumstances may render feasible the use of gear systems, lead screws, chains or like means. Upper and lower hydraulic cylinders 74 and 76 are shown in FIG. 2 attached as a 78a to mounting bracket means 78 secured to fixed structure, and at their opposite ends as at 80 by means of cylinder rods 82 and bracket means 84 welded or otherwise secured to the mold segments 70 and 72. As earlier noted, the mold segments along their inner ends are supported for swingable motion through bearing means 34 mounted by fixed shaft members 36 in the manner shown in FIG. 1.

The second actuating means method of operation will shortly be described in connection with the reference now to be made to third actuating means, which functions in cooperation with the first actuating means to control linear movement of the mold assemblies M-1 and M-2. As stated hereinabove, the second actuating means is effective to open and close the mold segments 70 and 72, and the third actuating means now to be described functions in a novel and efficient manner to return an open and completed mold assembly to start position, and as well, in combination with the first actuating means, to linearly advance a closed mold assembly in a precise fashion to the exact location for receiving melt from nozzle N of extruder E.

The third actuating means o this invention preferably takes the form of upper and lower fluid actuated cylinders 90 and 92 of the pneumatic or hydraulic type. However, as was earlier indicated in connection with the second actuating means, substitute mechanisms in the form of gear systems, lead screws, chains or like means may be employed.

As may be seen when reference is also made to FIG. 1, upper fluid actuated cylinder 90 is equipped with piston means 90a which makes connection with mold block or mold assembly M-1 through bracket means 94. In like fashion, linear travel of mold block or mold assembly M-2 is effected by mold-associated bracket means 96 connected to piston means 92a of fluid actuated cylinder 92. End frame member 10a (FIG. 2) is apertured as at 98 and 100 to receive therethrough cylinders 90 and 92, respectively.

The cooperative action of the first, second and third actuating means will be more fully understood when specific reference is made shortly to the schematic diagnammatic views of FIGS. 4 through 16 of the drawings. However, and again viewing FIGS. 1 and 2 particularly, after mold segments 70 and 72 of mold assembly M-2 are caused to open by action of fluid responsive cylinders 76, the third actuating means in the form of the fluid responsive cylinder 92 activated by the corrugator control system, causes open mold assembly M-2 to move rearwardly, or to the left in FIG. 1. Essentially simultaneously, and assuming fluid actuated cylinders 74 have caused the mold segments 70 an 72 of mold assembly M-1 to close, first actuating means in the form of the rack and pinion mechanism 60 and 6 of mold assembly M-1 advances it to a melt receiving position. At essentially the same time, the mold assembly designated in FIG. 1 by the legend M-2 is to the left of the other mold assembly. The closed mold assembly M-2 by its first actuating means is advanced, and by action of the third actuating means (cylinders 90 and 92), is moved precisely against the downstream mold assembly. Melt injection can now take place.

It is believed now apparent that applicant has provided a novel method and apparatus for the production of corrugated plastic tubing and parts related thereto, featuring a new and improved system of mold travel in a linear or essentially straight line path forwardly and rearwardly relative to an extrusion station and without substantial interruption in the linearly reversible mold shuttle herein disclosed. In this manner, the earlier noted disadvantages of the prior art, and particularly those associated with earlier track systems, employing an endless belt irrevesibly directed along a substantially helical path, are herein effectively eliminated.

Arising from the innovative mold travel concept hereinabove described is a novel arrangement of parts and process sequence associated therewith, wherein one mold assembly is caused to park or be set and left temporarily in a condition of readiness at a location downstream or upstream of the extrusion station. This additional departure from the prior art avoids the necessity of stopping operation of the corrugator in order to effect mold changes. As is known in the industry, there are periodic requirements for tubing fittings, exemplified by couplings, adapters, and the like. Previously in order to produce such parts, mold changes on the corrugator itself were necessitated, with consequent down time of possibly the entire apparatus.

In the application drawings, there is shown by phantom lines a third mold assembly M-3 effective for performance of the parking function to be more fully described hereinafter in connection with the succeeding views of the drawings. It will of course b understood, from FIG. 1, while not specifically illustrated therein, third mold assembly M-3 is equipped with first, second and third actuator means, as well as other related structure, so that linear or straight line travel may be imparted thereto in the manner described in detail hereinabove.

The novel linear travel and parking system concepts in combination will now be described in connection with the schematic diagrammatic views of FIGS. 4 through 16, although it will be appreciated by those skilled in the art that for certain applications the advantageous features of linear travel by itself are sufficient. The combination of straight line mold movement and parking, however, magnifies the cost and operational advantages of he present invention.

In the preceding paragraphs the first actuating means provided by applicant has been described by particular-references to FIGS. 1 and 3 as embracing drive racks 60 and pinion gears 62 with disclosed motive means, and the second actuating means as comprised of fluid cylinders 74 and 76 under direction of disclosed motive means. The third actuating means, on the other hand, is disclosed hereinabove as embracing fluid cylinders 90 and 92 with disclosed motive means. Within the confines of the schematic presentation in FIGS. 4 through 16 only certain of the members comprising the first, second and third actuating means are specifically designated by numerals, and accordingly, as the description now proceeds, references will be made to FIGS. 1 and 3 wherein said members are disclosed in detail.

Referring now first to FIG. 4 of the series of schematic views, mold carriages M-1 and M-2 of corrugating apparatus A are essentially in end to end abutment, and each is in closed position with mold M-2 receiving melt from nozzle N of extruder E. Mold carriage M-3, which may be provided for the purpose of producing tubing fittings exemplified by couplings, adapters, lud caps, and the like, is in parked position at a downstream location. Upon completion of the filling of the cavity of mold block M-2, first actuating means comprised of pinion gears 62 and drive racks 60 under control of motive means advances mold assemblies M-1 and M-2 to the position shown in FIG. 5.

The corrugating apparatus control system, constituted as hereinabove described, activates second actuating means comprised of top and bottom fluid responsive cylinders 74 and 76, causing mold block M-2 to open as shown in FIG. 6. Mold carriages M-1 and M-3 at this point remain in stationary position, as also appears in FIG. 6. The control system thereupon energizes third actuating means comprised of fluid responsive cylinders 90 and 92, casing open mold block M-2 to move rearwardly past mold block M-1, to the location or position of FIG. 7.

Figure 8:
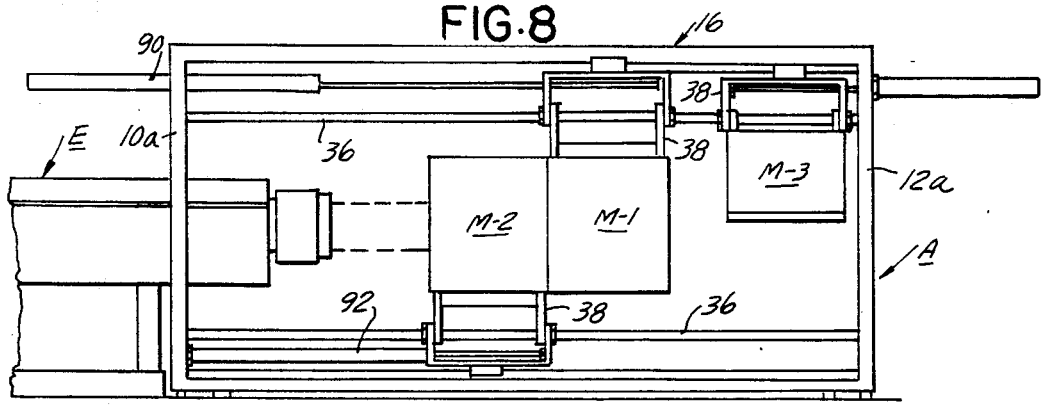

Air or hydraulic cylinders 74 and 76 comprising second actuating means are under action of the corrugator control system then cause mold block M-2 to close. Third actuating means, which includes fluid responsive cylinders 90 and 92 or equivalent means, causes closed mold block M-2 to advance forwardly until it abuts mold block M-1 as shown in FIG. 8. This action causes drive racks 60 to engage pinion gears 62 (first actuating means) of gear boxes 48 and 58, controlling movement or position of working mold M-1 to the precise location to accurately receive melt from extruder E.

Figure 9:
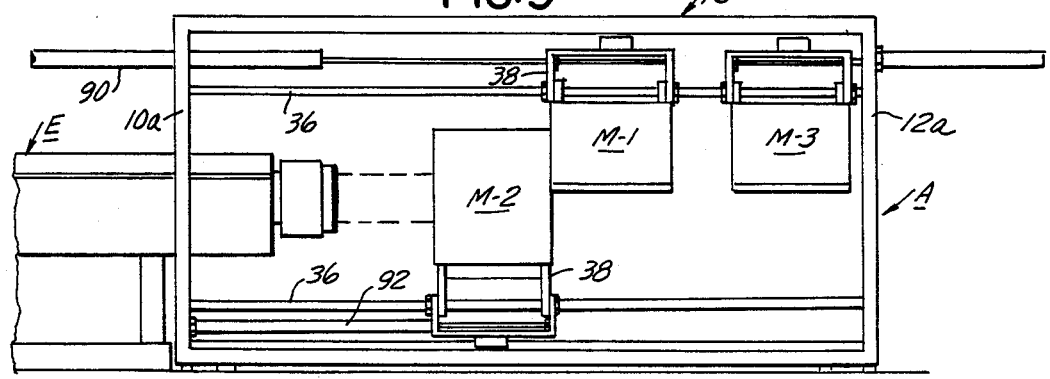

Referring now to FIG. 9, mold block M-1 is shown as having been opened, this being accomplished by second actuating means upon completion of the molding step. Mold blocks M-2 and M-3 are shown in FIG. 9 in the same position or location as in FIG. 8.

Figure 10:
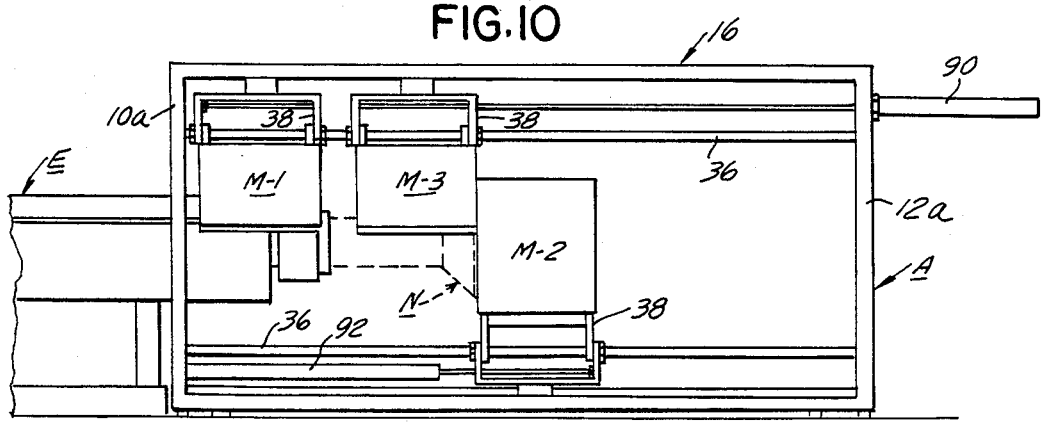

In FIG. 10 it can be seen that under control of individual third actuating means comprised of top and bottom fluid responsive cylinders 90 and 92, or means generally equivalent thereto, mold blocks M-1 and M-3 while in open position have been moved rearwardly past closed working mold block M-2 to a rearward parked position. It is believed now apparent from a comparison of FIGS. 8 and 10 that a position of park can either be forwardly or rearwardly of a working mold.

Figure 11:
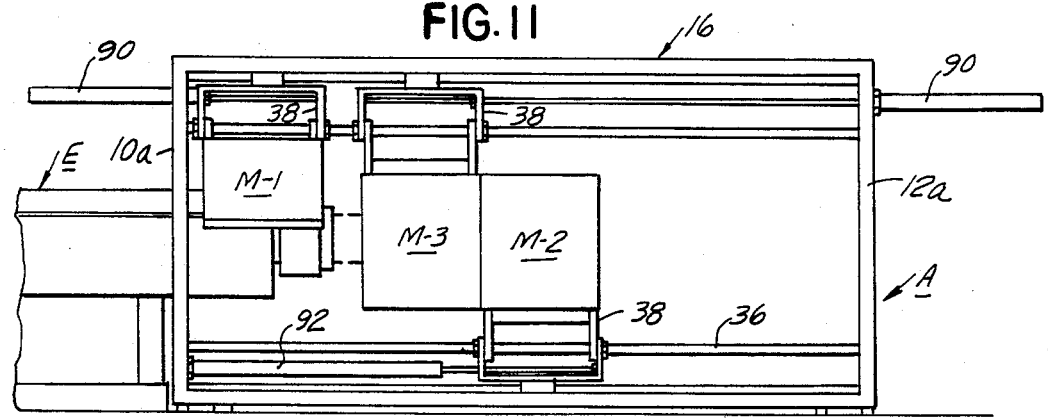

The sequence of steps in applicant's novel process of linear travel and parking in corrugated tubing manufacture is further portrayed by reference to FIG. 11. In this view mold block M-3 is caused to close by second actuating means, and is advanced by action of third actuating means into abutment with mold block M-2. At this point, first actuating means in the form of pinion gears 62 and drive racks 60 are effective as previously described to control the precise position of the working mold (M-2) relative to the extruder nozzle.

Figure 12:
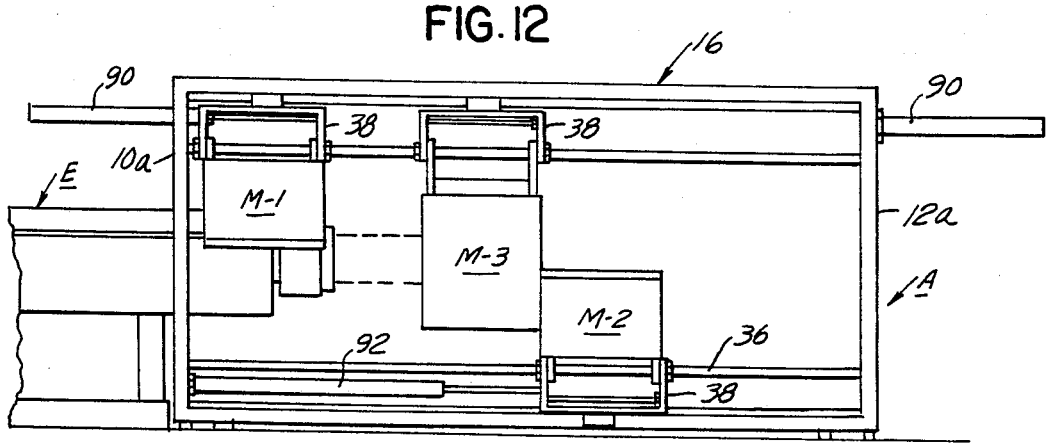

In FIG. 12 mold block M-1 remains in a stationary parked position, mold block M-2 is opened by second actuating means, and mold block M-3 is advanced slightly by third actuating means. The showing in FIG. 13 notes that mold block M-1 remains parked at a rearward location and open mold block M-2 under action of third actuating means is caused to move rearwardly past working mold M-3.

Figure 13:
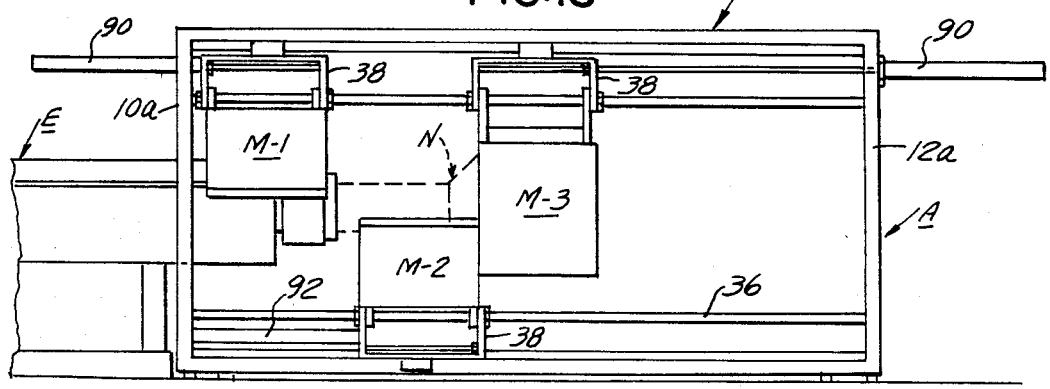

In FIG. 14 it can be seen that mold block M-2 has been closed by second actuating means comprised of fluid responsive cylinders 74 and 76 or equivalent means, while mold blocks M-1 and M-3 remain in generally the same position as in FIG. 13. However, as is shown in FIG. 15, the sequence of novel steps is continued by mold block M-2 advancing forwardly to working position through energization of third actuating manes, and mold block M-3 caused to open by second actuating means. The sequence of steps may be considered completed by open mold block M-1 advancing forwardly from a rearward parked position, and as is shown also in FIG. 16, mold block M-3 is moved forwardly by third actuating means to a downward parking position. Mold block M-2 remains in a working position, and by reference now to earlier described FIG. 4, the cycle is repeated by effecting the closing of mold block M-1.

It is also within the purview of this invention to provide a mold structure in which each pair of mold blocks is comprised of a plurality of separably openable segments or parts arranged to be in abutting end to end relationship when closed for the reception of extrudable thermoplastic material. A segmented mold arrangement as presently conceived permits the use of a reduced length extruder head, facilitates melt delivery from a laterally directed extruder, and permits improved support to the extruded tubular shape by provision of sequential opening of the mold segments. Opening and closing of the mold segments may not only be sequential, but may also be accomplished simultaneously on the mold carriage.

Figure 17:
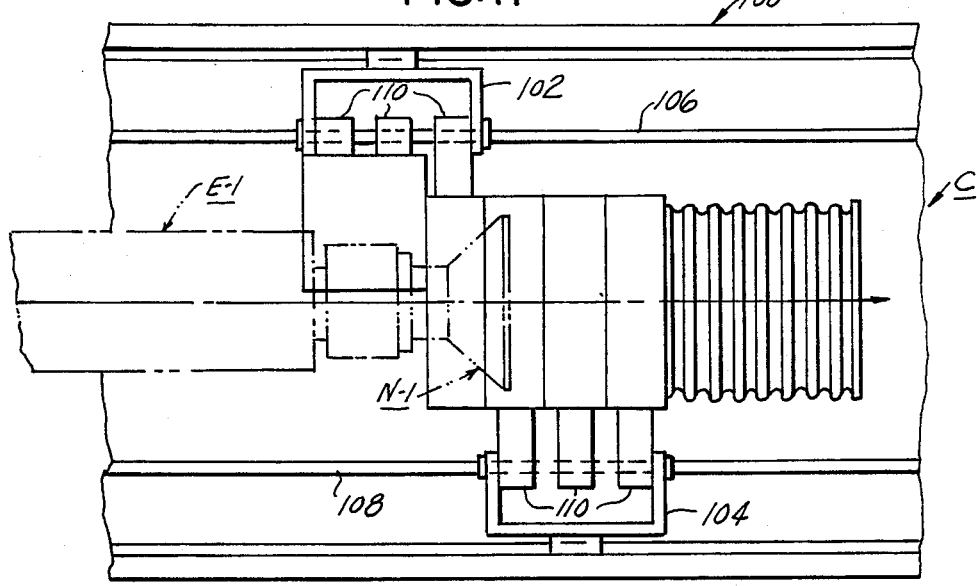
FIG. 17 is a fragmentary side elevational view portraying corrugating apparatus employing segmented mold blocks.

Exemplary apparatus possessed of the foregoing and other advantages is shown in FIG. 17, to which reference is now made. Corrugator apparatus as illustrated therein is designated generally by the legend C, and comprises a structural framework 100, which may be constituted essentially as described in connection with FIGS. 1-3. Corrugator operating mechanisms, including a control system, drive means, and first, second and third actuating means previously described are of course incorporated in the apparatus C of FIG. 17, even though not specifically shown therein.

Apparatus C for the manufacture of corrugated plastic tubing is associated with a stationary extruder E-1 provided with nozzle means N-1. Movable forwardly and rearwardly along framework 100 through the use of third actuator means or the equivalent thereof are mold carriage means 102 and 104 supporting through shaft means 106 and 108 a plurality of second actuating means 110, which may be provided by fluid responsive cylinders or means equivalent thereto. Individually or separably connected in any suitable manner to each of the second actuating means 110 is a like number of pairs of mold segments 112, which illustratively are six in number, although this may vary widely.

The method of operation of apparatus C is believed now apparent from the foregoing description when taken in connection with FIG. 17. The mold segments 112 are caused to travel forwardly and rearwardly by third actuating means as described in connection with FIGS. 1, 2 and 3 and the accompanying description. Similarly, opening and closing of the pairs of mold segments 112 as desired is accomplished by use of second actuating means, as disclosed in detail in the preceding paragraphs. First actuating means provided by pinion gears and drive racks for control of mold movement from a part of the inventive concept of FIG. 17.

It may upon occasion be found desirable to effect an interlock between end to end abutting mold blocks, or segments thereof, particularly when one of the mold blocks is in working or melt receiving position and the abutting or upstream mold block is in a ready position. This was earlier described in connection with mold blocks M-1 and M-2 of FIG. 1, with particular reference to the action of pinion gears 62 and drive racks 60 exemplifying first actuating means in controlling precise movement of working mold M-2 to an exact location to receive melt from extruder nozzle N. Among the advantages flowing from a mold interlocking arrangement is avoiding the possibility of melt leakage between the abutting mold blocks, as well as possible air leakage when the extruded material is blow molded against the mold cavity contours through vacuum forces.

Figure 18:
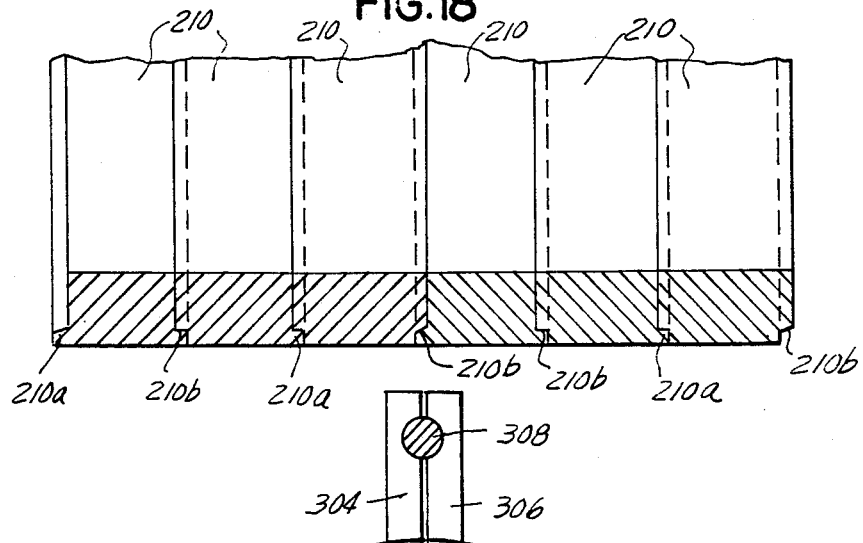
FIG. 18 is a fragmentary sectional view showing one form of mold interlocking means.

An exemplary mold interlock arrangement is illustrated in FIG. 18 in connection with a segmented mold structure, however, the concept is clearly applicable to mold blocks of the character shown in FIGS. 1 and 3. Each mold segment 210 of FIG. 18 is complimentarily machined or otherwise formed along the outer circumference thereof to provide a stepped or tonguelike surface 210a thereon for mating interlocking engagement with a recessed or groove-like surface 210b on a next adjacent mold segment 210. In this manner, the possibility of leakage of melt or air is essentially entirely eliminated.

Figure 19:
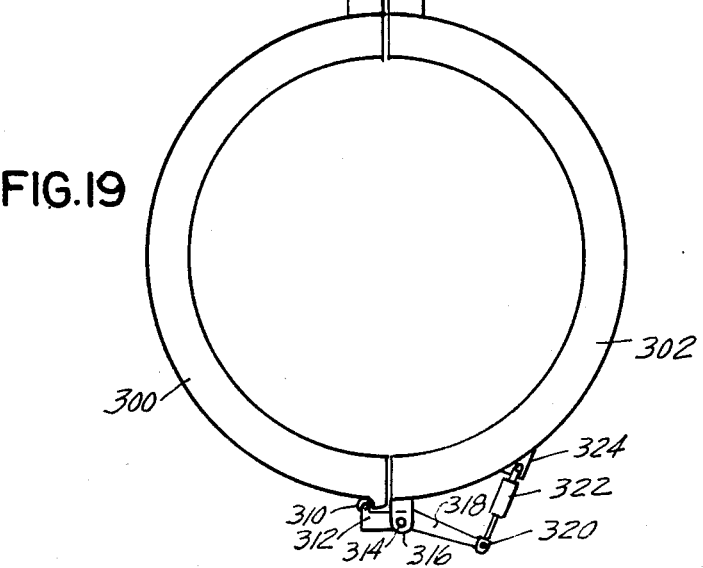
FIG. 19 is an end elevational view of an exemplary form of mold latching means.

In a clam shell type of mold construction of the character portrayed in FIG. 3, it may upon occasion be found desirable to effect even more firm securement of the mold halves one to another after closure thereof by second actuating means exemplified by fluid responsive cylinders 74 and 76 or equivalent means as noted hereinabove. By the present invention locking or latching means are provided to effect more firm securement of the mold halves, and this is shown in FIG. 19.

As illustrated therein, mold halves 300 and 302 mount a one end bracket means 304 and 306 supported by shaft means 308. Mold half 300 at the opposite end thereof mounts catch means 310 engageable by claw or finger means 312 pivotally mounted by pin means 314 upon bifurcated bracket means 316 supported by mold half 302. Pin means 314 and bracket means 316 also supports lever arm 318 pinned or otherwise attached at 320 to connecting means 322 in turn secured at 324 to mold half 302. The latch arrangement shown and described is effective to assure firm securement of the mold halves in tightly closed relationship.

Various changes and modifications to the present invention have been described herein, and these and other changes may of course be effected without departing from the spirit of the invention or the scope of the subjoined claims.

I claim:

1. Apparatus for the manufacture of plastic tubing, comprising a supporting framework, a plurality of mold carriages mounted by said framework for linear travel therealong, a pair of mold blocks connected to each of said carriages, first actuating means for moving one of said carriages and the mold blocks thereon along a linear path to an extrusion station for the introduction of molten plastic material, second actuating means for closing and opening said mold blocks respectively prior to and after the introduction of plastic material therein, third actuating means for moving another of said carriages and open mold blocks thereon along a linear path rearwardly past a pair of closed mold blocks, and motive means in control of said first, second and third actuating means.

2. Apparatus of the character defined in claim 1, in which there is provided means connecting said first and said third actuating means to precisely control the location of the mold carriages and mold blocks thereon relative to the extrusion station.

3. Apparatus of the character defined in claim 1, in which said first actuating means comprises a pinion gear and drive rack arrangement, and in which said second and third actuating means are fluid responsive cylinders.

4. Apparatus of the character defined in claim 1, in which each pair of mold blocks is complementarily circumferentially formed with mating surfaces to make substantial interlocking engagement therebetween.

5. Apparatus of the character defined in claim 1, in which each pair of mold blocks comprises a plurality of separable independently controllable mold segments arranged in side by side relationship.

6. Apparatus of the character defined in claim 1, in which each pair of mold blocks is of clam-shell configuration hingedly connected at one end thereof, and in which there is provided at the opposite end thereof latch means for effecting tight securement between the clam-shell like mold blocks.

7. Apparatus for producing corrugated plastic tubing, comprising a supporting framework, an extruder associated with said framework for discharging molten plastic, mounting means connected to said framework for reversible linear travel therealong, means connected to said mounting means defining a plurality of independently operable hingedly connected mold cavities, a plurality of actuating means connected to said mounting means and to respective said mold cavity defining means for sequentially opening and closing said mold cavities and for moving said mounting means and mold cavities connected thereto along a linear path forwardly and rearwardly with respect to said extruder, and motive means in control of said actuating means.

* * * * *